(12) United States Patent
Scofield

(10) Patent No.: US 12,153,292 B2
(45) Date of Patent: Nov. 26, 2024

(54) OPTICAL RING MODULATOR

(71) Applicant: ROCKLEY PHOTONICS LIMITED, Altrincham (GB)

(72) Inventor: Adam Scofield, Los Angeles, CA (US)

(73) Assignee: Rockley Photonics Limited, Altrincham (GB)

(*) Notice: Subject to any disclaimer, the term of this patent is extended or adjusted under 35 U.S.C. 154(b) by 233 days.

(21) Appl. No.: 17/753,231

(22) PCT Filed: Aug. 25, 2020

(86) PCT No.: PCT/EP2020/073758
§ 371 (c)(1),
(2) Date: Feb. 24, 2022

(87) PCT Pub. No.: WO2021/037855
PCT Pub. Date: Mar. 4, 2021

(65) Prior Publication Data
US 2022/0291531 A1    Sep. 15, 2022

Related U.S. Application Data

(60) Provisional application No. 62/891,852, filed on Aug. 26, 2019.

(51) Int. Cl.
*G02F 1/025* (2006.01)
*G02F 1/225* (2006.01)

(52) U.S. Cl.
CPC ............ *G02F 1/025* (2013.01); *G02F 1/2257* (2013.01); *G02F 2203/15* (2013.01)

(58) Field of Classification Search
CPC .... G02F 1/025; G02F 1/2257; G02F 2203/15; G02F 1/015; G02F 1/0154
See application file for complete search history.

(56) References Cited

U.S. PATENT DOCUMENTS 9,784,995 B2 * 10/2017 Hauenschild ......... G02F 1/0147
2017/0176779 A1    6/2017 Hauenschild et al.
2019/0041720 A1    2/2019 Ehrlichman et al.

FOREIGN PATENT DOCUMENTS

EP    3 185 065 A1    6/2017

OTHER PUBLICATIONS

International Search Report and Written Opinion of the International Searching Authority, mailed Oct. 28, 2020, corresponding to PCT/EP2020/073758, 15 pages.

(Continued)

*Primary Examiner* — John Bedtelyon
(74) *Attorney, Agent, or Firm* — Lewis Roca Rothgerber Christie LLP

(57) ABSTRACT

An optical ring modulator for use as a PAM-N modulator, the optical ring modulator comprising:
  a first optical waveguide which forms a bus waveguide;
  a ring waveguide optically coupled to the bus waveguide; wherein, the ring waveguide comprises:
  a first electrode region having a first pn junction or first Moscap, the first pn junction or first Moscap configured to generate a first phase shift upon application of a given voltage across the first pn junction or first Moscap; and
  a second electrode region having a second pn junction or second Moscap, the second pn junction or second Moscap configured to generate a second phase shift when the given voltage is applied across the second pn junction or second Moscap, wherein the second phase shift is less than the first phase shift.

10 Claims, 2 Drawing Sheets

(56) References Cited

OTHER PUBLICATIONS

Palermo, S. et al., "PAM4 Silicon Photonic Microring Resonator-Based Transceiver Circuits", Proceedings of SPIE, Feb. 20, 2017, pp. 101090F-1-101090F-7, vol. 10109.
Shi, W. et al., "Silicon photonic modulators for PAM transmissions", Journal of Optics, Jul. 5, 2018, pp. 1-18, vol. 20, No. 8, IOP Publishing Ltd.
U.K. Intellectual Property Office Search and Examination Report, dated Feb. 15, 2021, for Patent Application No. GB2013258.5, 7 pages.

* cited by examiner

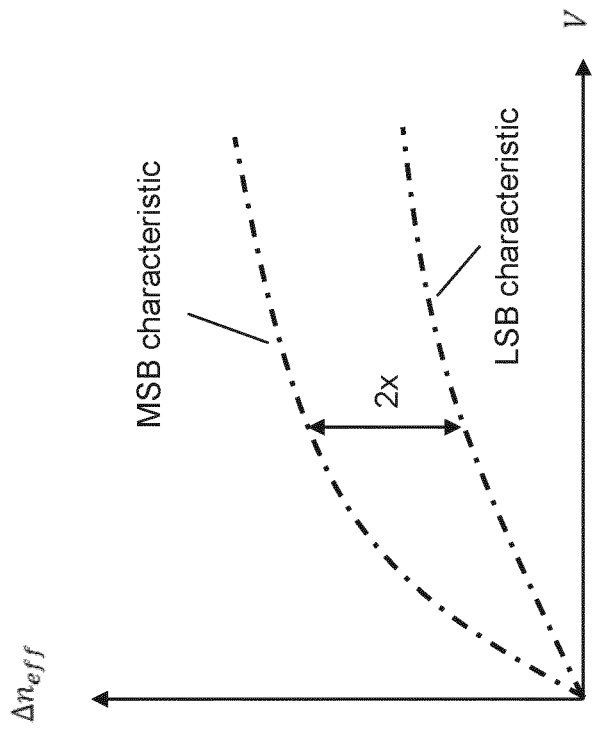
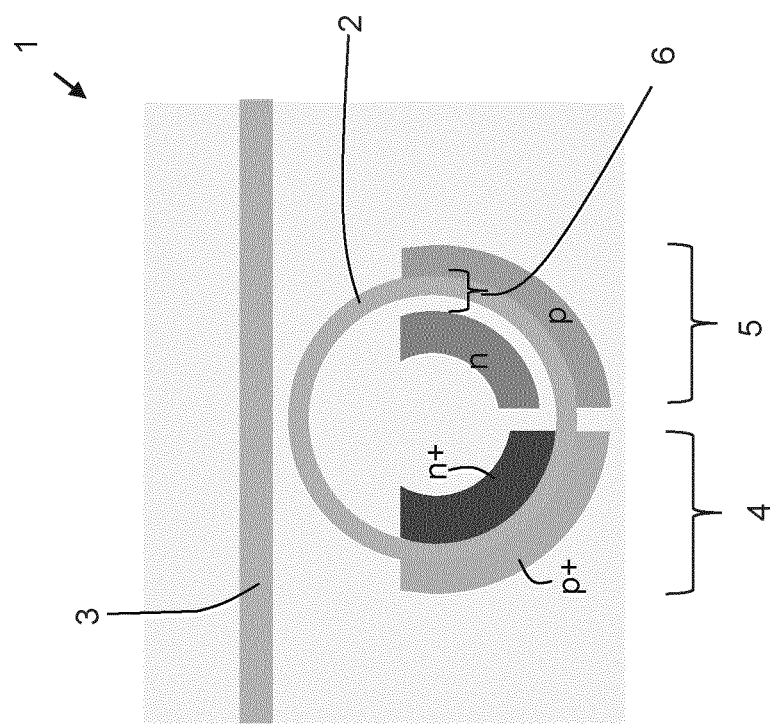
Fig. 1A
Fig. 1B

OPTICAL RING MODULATOR

CROSS REFERENCE TO RELATED APPLICATIONS

This application is a National Stage Application of PCT/EP2020/073758, filed 25 Aug. 2020, which claims benefit of Ser. No. 62/891,852, filed 26 Aug. 2019 in the United States; each of the applications identified in this paragraph is incorporated herein by reference. To the extent appropriate, a claim of priority is made to each of the above-identified applications.

FIELD

One or more aspects of embodiments according to the present invention relate to an optical ring modulator, and more particularly to an optical ring modulator comprising at least a first and second electrode region.

BACKGROUND

Silicon microring modulators are used in transmitters with advanced modulation formats, in particular PAM-4 modulation. Many silicon microring modulators use a single drive electrode. For a single drive electrode, the modulator is inherently nonlinear, which requires a complex, high-power consumption driver to compensate.

Dual drive versions are known (see for example U.S. Pat. No. 9,784,995), in which the ring modulator includes two electrodes of different lengths, such that one electrode is roughly 2× length of the first electrode. However, the requirement for different electrode sizes gets more complicated when the modulator is scaled up from PAM-4 to other PAM-N systems since the ring resonator will eventually run out of real estate.

SUMMARY

Accordingly, the present invention aims to solve the above problems by providing, according to a first aspect, an optical ring modulator for use as a PAM-N modulator, the optical ring modulator comprising:
a first optical waveguide which forms a bus waveguide;
a ring waveguide optically coupled to the bus waveguide;
wherein, the ring waveguide comprises:
a first electrode region having a first pn junction configured to generate a first phase shift upon application of a given voltage across the pn junction; and
a second electrode region having a second pn junction configured to generate a second phase shift when the given voltage is applied across the second pn junction, wherein the second phase shift is less than the first phase shift.

Optional features of the invention will now be set out. These are applicable singly or in any combination with any aspect of the invention.

Optionally, the pn junction of the first electrode region contains greater dopant concentrations than the pn junction of the second electrode region. In this way, the first electrode region is the "most significant bit" (MSB) and the second electrode region is the "least significant bit" (LSB).

Optionally, the pn junction of the first electrode region forms a narrower junction than the pn junction of the second electrode region. In this way, the LSB has a wider junction; either physically, as in a PIN junction, or effectively by reducing the doping levels and so providing a wider depletion region.

According to a second aspect of the present invention, there is provided an optical ring modulator for use as a PAM-N modulator, the optical ring modulator comprising:
a first optical waveguide which forms a bus waveguide;
a ring waveguide optically coupled to the bus waveguide;
wherein, the ring waveguide comprises:
a first electrode region having a first metal oxide semiconductor capacitor (Moscap) configured to generate a first phase shift upon application of a given voltage across the Moscap; and
a second electrode region having a second Moscap configured to generate a second phase shift when the given voltage is applied across the second Moscap, wherein the second phase shift is less than the first phase shift.

In such an embodiment, the transfer function (and therefore the phase shift experienced by light signals passing through the relevant segment of the ring waveguide) is controlled by the thickness of the oxide located within the ring waveguide and also by the doping density of the p and n regions which make up the Moscap. The Moscap may comprise: an n-doped semiconductor, an insulator, and a p-doped semiconductor. The insulator may be at least 1 nm and no more than 100 nm thick (i.e. span a distance between the n-doped and p-doped semiconductors of at least 1 nm and no more than 100 nm). The junction formed by the n-doped semiconductor, insulator, and p-doped semiconductor may be horizontal or vertical.

Each Moscap may be formed as a segment of the silicon ring waveguide, doped with a p-type dopant on one side and an n-type dopant on the other side, with an insulator gap formed from an insulating oxide layer in-between the p doped and n doped portions so that when a current is applied between the p and n doped portions, a charge builds up across the insulator gap.

In some embodiments, the p doped portion is located on the outside-side of the ring waveguide, and the n doped portion is located on the inside-side of the ring waveguide (i.e. within the ring of the ring waveguide).

Optionally, the Moscap of the first electrode region contains greater dopant concentrations than the Moscap junction of the second electrode region. In this way, the first electrode region forms the Most Significant Bit (MSB) and the second electrode region forms the Least Significant Bit (LSB).

Optionally, the Moscap of the first electrode region comprises a first oxide layer having a first thickness and the Moscap of the second electrode region comprises a second oxide having a second thickness, the second thickness being greater than the first thickness. Again, the first electrode region therefore forms the Most Significant Bit (MSB) and the second electrode region forms the Least Significant Bit (LSB).

Optionally, the magnitude of the second phase shift is half of the magnitude of first phase shift. By "half of", it should be understood that the second phase shift may shift the signal by an amount (e.g. in radians) that is half of or substantially half of the amount by which the first phase shift shifts the signal.

Optionally, the modulator functions as a PAM-4 modulator. For a PAM-4 modulator, only the first and second electrode regions are required. If two different voltages can be applied to each electrode region, this gives rise to a total of four different signal configurations. In an example, one of the two different voltages may be zero volts, and the other a voltage greater than zero. Alternatively the two different voltages are both non-zero voltages. Extra electrodes will give rise to additional signals. For example, in some embodiments, the ring modulator may further comprise a third electrode region configured to generate a third phase shift when the given voltage is applied. The third phase shift may be less than the first phase shift and less than the second phase shift. In this way, assuming that the third electrode is also capable of operating on two different configurations, the ring modulator will take the form of a PAM-8 modulator with 8 possible overall signals.

In some embodiments, the arc length of the first electrode region along the ring waveguide is equal to the arc length of the second electrode region. In this way, the segment of the ring modulator covered by the first electrode is equal to the segment of the ring modulator covered by the second electrode. By "equal" it is intended that the arc lengths of the first and second electrodes are the same, or substantially the same. The important feature is that the response of the electrode region is not determined by the arc length of the electrode region along the ring waveguide. Instead it is the parameters engineered into the junction itself, such as the dopant level and the junction width that determine the phase shift experienced by light within the ring modulator when a voltage is applied across the electrode region.

Further optional features of the invention are set out below.

BRIEF DESCRIPTION OF THE DRAWINGS

Embodiments of the invention will now be described by way of example with reference to the accompanying drawings in which:

FIG. 1A is a schematic diagram of a ring modulator according to a first embodiment of the present invention and FIG. 1B depicts an example of refractive index vs voltage for the Most Significant Bit (MSB) relative to the Least Significant Bit (LSB)

DETAILED DESCRIPTION

Figures 2A, 2B:
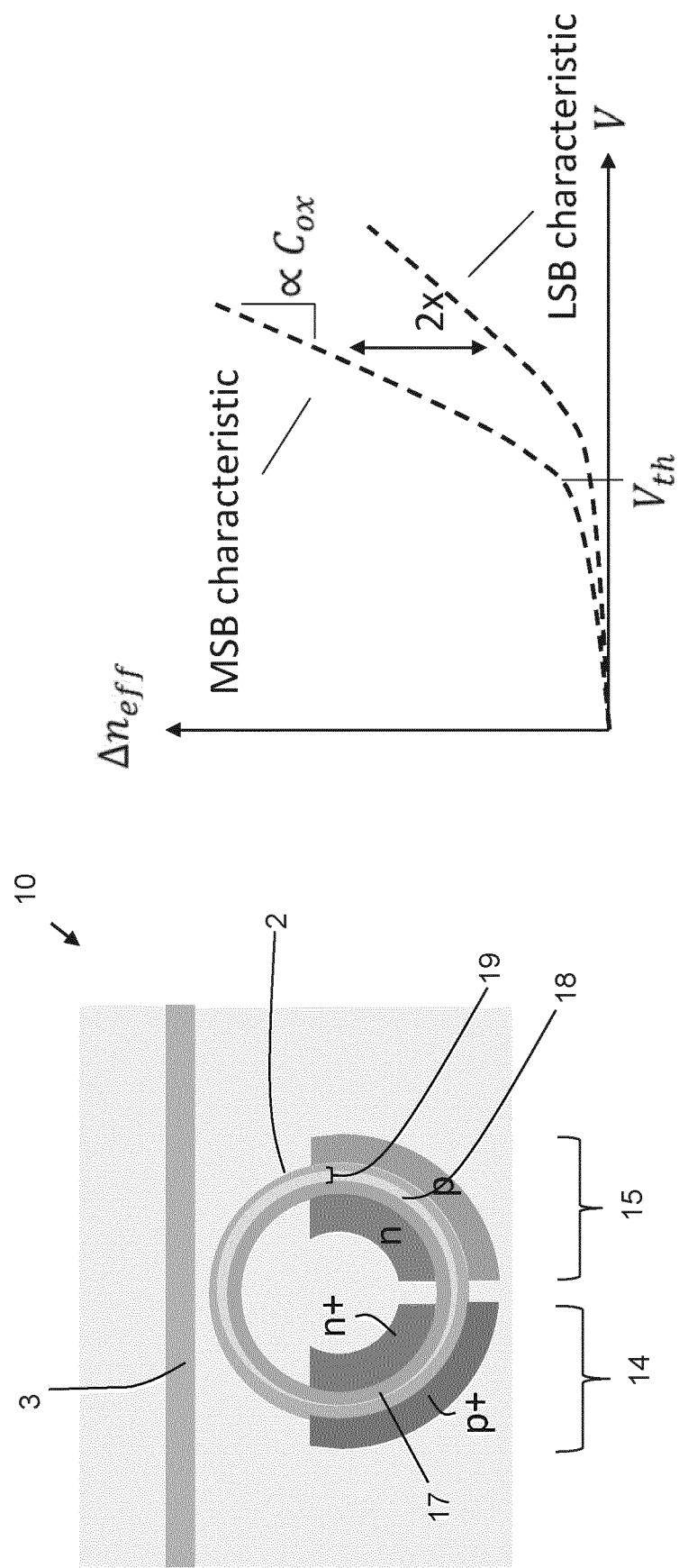
FIG. 2A is a schematic diagram of a ring modulator according to a second embodiment of the present invention and FIG. 2B depicts an example of refractive index vs voltage for the Most Significant Bit (MSB) relative to the Least Significant Bit (LSB).

The detailed description set forth below in connection with the appended drawings is intended as a description of exemplary embodiments of an optical ring modulator provided in accordance with the present invention and is not intended to represent the only forms in which the present invention may be constructed or utilized.

A first embodiment of an optical ring modulator 1 is described below with reference to FIGS. 1A and 1B. The optical ring modulator is made up of a ring waveguide 2 which is typically a silicon waveguide such as a rib waveguide fabricated on a silicon-on-insulator platform. Light is coupled into and/or out of the ring waveguide by way of a bus waveguide 3 which takes the form of a straight waveguide, again typically fabricated on a silicon-on-insulator platform. In an alternative example, not shown, the bus waveguide 3 may comprise a separate input and output waveguide to which the ring waveguide is coupled. That is, the bus waveguide 3 may be non-continuous with a break along its length.

At one segment of the ring waveguide 2 a first electrode region 4 is located, the first electrode region being made up of a first pn junction which is configured to generate a first phase shift upon application of a given voltage across the pn junction. Electrodes (not shown) facilitate application of the given voltage bias across the junction. The first pn junction is formed from a p+ doped region at one side of the ring waveguide and an n+ doped portion at the other side of the ring waveguide. In the embodiment shown, the p+ doped portion is located on the outer side of the ring waveguide and the n+ doped portion is located on the inner side of the ring waveguide.

A second electrode region 5 is located at a different segment of the ring waveguide from the first electrode region. The second electrode region 5 includes a second pn junction, the second pn junction configured to generate a second phase shift when the given voltage is applied across the second pn junction, wherein the second phase shift is less than the first phase shift. In the embodiment shown, the pn junction of the second electrode region is made up of a p doped region on the outside side of the ring waveguide and an n doped region on the inside side of the ring waveguide. The n doped and p doped regions have lower dopant concentrations as compared to the n+ and p+ regions of the first electrode region. The dopant used to provide the n/n+ doped region may be any suitable dopant, for example phosphorus or arsenic. The dopant used to provide the p/p+ doped region may be any suitable dopant, for example boron or aluminum. The n doped region and p doped region may be doped to a level of at least $1 \times 10^{16} cm^{-3}$ to no more than $1 \times 10^{19} cm^{-3}$. The regions can be doped in any suitable way known per se to the skilled person. In this way, the first electrode region 4 forms the Most Significant Bit (MSB) of the ring modulator 1 and the second electrode region 5 forms the Least Significant Bit (LSB) of the ring modulator 1. By applying two different voltages to either of the electrode regions it is possible to generate two different phase shifts. Since there are two electrode regions, this gives rise to a total of 4 different modulation states. That is to say, the modulator is capable to functioning as a PAM-4 modulator. If an extra electrode was added and operated in a similar manner to the first and second electrode regions, the ring modulator would be capable of functioning as a PAM-8 modulator. The voltages applied may be within the range of no less than −5V to no more than 5V. The electrodes may be provided through any suitable metallization process known per se to the skilled person.

In addition to the dopant densities of the two electrode regions, the second electrode region differs from the first electrode region in that it has a wider pn junction. This gives rise to a greater depletion width, which also has an effect in controlling the transfer function of the electrode region. The width of the depletion may be at least 10 nm and no more than 1000 nm. The difference in the dopant concentration and difference in the depletion width combine to result in a phase shift induced by a given voltage applied across the pn junction of the second electrode region which is different from the phase shift induced by a voltage of the same magnitude applied across the pn junction of the first electrode region.

In the embodiment shown in FIG. 1A, the first electrode region extends over a segment which is equal to or substantially equal to the segment along which the second electrode region 5 extends. Thus, since the sizes of the two regions are the same, any difference between the phase shift response of the second electrode region as compared to the first is caused only by a difference in the pn junction properties, notably dopant concentration and depletion width. An example of the difference can be seen from FIG. 1B, where the effective refractive index is plotted against applied the voltage bias applied across the junction for each of the two electrode regions. It can be seen that the first electrode region (the MSB) experiences a change in refractive index which is approximately double that experienced by the second electrode region (the LSB).

A second example of a ring modulator 10 is described below with reference to FIGS. 2A and 2B where like numerals are used to denote features already described above in detail in relation to the ring modulator of FIGS. 1A and 1B.

The ring modulator 10 of FIG. 2A differs from that of FIG. 1A in that the first electrode region 14 and second electrode region 15 are formed from metal oxide semiconductor capacitors (Moscaps) rather than from pn junctions. They are therefore typically operated in a reverse bias mode. In some examples, they may be operated in a reverse bias.

As with the embodiment of FIG. 1A, the ring modulator of FIG. 2A comprises first and second electrode regions that are of equal size in terms of the arc length of the segments they occupy along the circumference of the ring waveguide 2. As can be seen from FIG. 2B, the first electrode region 15 (the MSB) exhibits a change in refractive index which is at least two times that exhibited by the second electrode region (the LSB) when any given voltage is applied. In this case, it is the fabrication parameters of the Moscap of the respective electrode regions which determines the relative phase shift experienced by light travelling through each electrode region under application of the given voltage. In particular, the Moscap of the first electrode region 14 comprises an oxide region 17 which is thinner than the oxide region 18 within the Moscap of the second electrode region 15. The thickness of the oxide 19 should be understood to correspond to its width in a direction perpendicular to the direction of travel of light around the ring waveguide. The oxide, or other insulator located between the doped regions, may have a thickness of at least 1 nm and no more than 100 nm. The important feature is the width of the oxide layer as measured between the p doped and n doped regions, since this is the size of the insulating gap of the capacitor.

In addition to the thickness of the oxide layer, the dopant concentrations of the first and second electrode regions are selected to affect the phase shift experienced by light passing through the relevant electrode region when a given voltage is applied. As can be seen in FIG. 2A, the first electrode region 14 which forms the MSB is made up of more concentrated n+ and p+ doped portions as compared to the relatively less concentrated n and p doped regions of the second electrode region 15 which forms the LSB of the ring modulator.

The first electrode region 14 extends over a segment which is equal to or substantially equal to the segment along which the second electrode region 15 extends.

For all embodiments described herein, the ring modulator is fabricated with a diameter that could be considered to relate to a microring modulator. For example, the diameter of the ring modulator may be at least 5 μm and no more than 5000 μm the embodiments shown in FIGS. 1A and 2A, the electrodes have a 90° arc angle. However other angles may be used.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. All references referred to above are hereby incorporated by reference.

What is claimed is:

1. An optical ring modulator for use as a PAM-N modulator, the optical ring modulator comprising:
   a first optical waveguide which forms a bus waveguide; and
   a ring waveguide optically coupled to the bus waveguide, wherein, the ring waveguide comprises:
   a first electrode region having a first pn junction, the first pn junction configured to generate a first phase shift upon application of a given voltage across the first pn junction; and
   a second electrode region having a second pn junction, the second pn junction configured to generate a second phase shift when the given voltage is applied across the second pn junction, wherein the second phase shift is less than the first phase shift, and
   wherein the first electrode region and the second electrode region are differentiated by at least one of the following:
      a dopant concentration in the first pn junction is greater than a dopant concentration in the second pn junction; or
      a junction between p- and n-doped portions of the first pn junction is narrower than a junction between the p- and n-doped portions of the second pn junction.

2. The optical ring modulator of claim 1, wherein the first pn junction of the first electrode region contains greater dopant concentrations than the second pn junction of the second electrode region.

3. The optical ring modulator of claim 1, wherein the first pn junction of the first electrode region forms a narrower junction than the second pn junction of the second electrode region.

4. The optical ring modulator claim 1, wherein the second phase shift is half of the first phase shift.

5. The optical ring modulator of claim 1, wherein the modulator functions as a PAM-4 modulator.

6. The optical ring modulator according to claim 1, further comprising a third electrode region configured to generate a third phase shift when the given voltage is applied, wherein the third phase shift is less than the first phase shift and less than the second phase shift.

7. The optical ring modulator of claim 1, wherein the arc length of the first electrode region along the ring waveguide is equal to the arc length of the second electrode region.

8. An optical ring modulator for use as a PAM-N modulator, the optical ring modulator comprising:
   a first optical waveguide which forms a bus waveguide; and
   a ring waveguide optically coupled to the bus waveguide, wherein, the ring waveguide comprises:
   a first electrode region having a first metal oxide semiconductor capacitor (Moscap) configured to generate a first phase shift upon application of a given voltage across the first Moscap; and
   a second electrode region having a second Moscap configured to generate a second phase shift when the given voltage is applied across the second Moscap, wherein the second phase shift is less than the first phase shift, and
   wherein the first Moscap and the second Moscap are differentiated by at least one of the following:
      a dopant concentration in the first Moscap is greater than a dopant concentration in the second Moscap; or
      a width of an oxide portion in the first Moscap is less than a width of an oxide portion in the second Moscap.

9. The optical ring modulator of claim 8, wherein the first Moscap of the first electrode region contains greater dopant concentrations than the second Moscap of the second electrode region.

10. The optical ring modulator of claim 8, wherein the first Moscap of the first electrode region comprises a first oxide layer having a first width and the second Moscap of the second electrode region comprises a second oxide layer having a second width, the second width being greater than the first width.

* * * * *